United States Patent [19]
Vandevijver et al.

[11] Patent Number: 5,969,050
[45] Date of Patent: *Oct. 19, 1999

[54] CONTINUOUS PROCESS FOR GRAFTING A POLYOLEFIN, THE GRAFTED POLYOLEFINS OBTAINED BY MEANS OF THIS PROCESS

[75] Inventors: Eric Vandevijver, Brussels; Pascal Lefèvre, Lebbeke; Eric Fassiau, Mons; Claude Vogels, Lasne, all of Belgium

[73] Assignee: Solvay Polyolefins Europe-Belgium, Brussels, Belgium

[ * ] Notice: This patent is subject to a terminal disclaimer.

[21] Appl. No.: 08/755,725

[22] Filed: Nov. 25, 1996

Related U.S. Application Data

[63] Continuation of application No. 08/361,809, Dec. 22, 1994.

[30] Foreign Application Priority Data

Dec. 27, 1993 [BE] Belgium ................................ 09301469

[51] Int. Cl.$^6$ .................................................. C08F 267/04
[52] U.S. Cl. ........................ 525/285; 525/263; 525/264; 528/499
[58] Field of Search .................................... 525/285, 264, 525/283; 528/499

[56] References Cited

U.S. PATENT DOCUMENTS

| | | | |
|---|---|---|---|
| 3,884,451 | 5/1975 | Stenmark et al. | 259/191 |
| 4,187,212 | 2/1980 | Zinke et al. | 260/45.8 |
| 4,290,941 | 9/1981 | Zinke et al. | 260/45.85 |
| 4,923,918 | 5/1990 | Komori et al. | 524/339 |
| 4,927,888 | 5/1990 | Strait et al. | 525/285 |
| 5,021,510 | 6/1991 | Vroomans et al. | 525/285 |
| 5,216,061 | 6/1993 | Boudreaux, Jr. | 524/392 |
| 5,231,132 | 7/1993 | Khovri | 525/92 |
| 5,276,135 | 1/1994 | Powell | 528/483 |
| 5,650,468 | 7/1997 | Vandevijver et al. | 525/285 |

FOREIGN PATENT DOCUMENTS

| | | |
|---|---|---|
| 2026900 | 4/1991 | Canada . |
| 62-011703 | 6/1987 | Japan . |
| 5002919 | 1/1993 | Japan . |

OTHER PUBLICATIONS

Chemical Abstracts, Abstract No. 105:154162c; vol. 105, No. 9, p. 45, "Propylene Polymer Compositions", Hamada Yoshinori et al. (Nov. 1, 1986).

*Primary Examiner*—Edward J. Cain
*Attorney, Agent, or Firm*—Venable; Marina V. Schneller

[57] ABSTRACT

Continous process for grafting a polyolefin within a melt including a polyolefin of linear olefin containing from 2 to 8 carbon atoms, a graftable functional monomer and a radical-generator, in an extruder including at its exit a compression zone followed by a discharge zone, in which at least one antioxidant additive is introduced into the melt not later than before the latter enters the compression zone of the extruder.

Stabilized grafted polyolefin obtained by means of this process.

22 Claims, No Drawings

CONTINUOUS PROCESS FOR GRAFTING A POLYOLEFIN, THE GRAFTED POLYOLEFINS OBTAINED BY MEANS OF THIS PROCESS

CROSS-REFERENCE TO RELATED APPLICATION

This application is a continuation of application Ser. No. 08/361,809 filed Dec. 22, 1994, the entire disclosure of which is incorporated herein by reference.

The present invention relates to a continuous process for grafting a polyolefin by reactive extrusion of a mixture of a molten polyolefin, a graftable functional monomer and a radical-generator, in particular to a continuous process for grafting a linear olefin polyolefin. It also relates to the stabilized grafted polyolefins thus obtained.

FIELD OF THE INVENTION

It is well known to modify the properties of a polyolefin by grafting the polyolefin as a melt in an extruder, a technique generally called "grafting by reactive extrusion", as described especially in Example 1 of U.S. Pat. No. 4,927,888. In this known process an extruder is fed with polyethylene and then with a mixture of maleic anhydride (graftable monomer), methyl ethyl ketone (solvent) and 2,5-dimethyl-2,5-di(t-butylperoxy)-3-hexyne (radical-generator), and a polyethylene grafted with maleic anhydride is collected at the extruder exit.

This known process has the disadvantage of producing a grafted polyolefin of low heat stability to oxygen.

U.S. Pat. No. 3,884,451 describes an extrusion process usable for mixing paints. In this patent it is also proposed, quite generally, to employ this extrusion process for adding oxidation inhibitors to rubbery or thermoplastic materials, separately or simultaneously in the extruder.

In U.S. Pat. No. 5,216,061 a process has been proposed for the manufacture of mixtures based on grafted polyolefins of branched higher alpha-olefins with a melting point of more than 180° C., preferably grafted polymethylpentene additionally containing a thioaliphatic compound and glass fibres. According to this process the polymethylpentene is mixed with a stabilizer of the hindered phenol type, the polymethylpentene thus stabilized is then mixed dry and at ambient temperature with a peroxide (radical-generator) and a graftable monomer (silane), the mixture thus obtained is introduced into an extruder, the extruder is fed, after the grafting reaction, with a thioaliphatic additive and glass fibres, at a spot situated midway between the introduction of the mixture (including the polymethylpentene, the hindered phenol, the peroxide and the graftable monomer) and the extruder discharge, and the mixture thus obtained is granulated on leaving the extruder.

TECHNOLOGY REVIEW

It has been found that grafting a polyolefin of linear monomers by reactive extrusion gives rise to heat stability problems. The simultaneous introduction of an antioxidant additive with the other reactants (polyolefin, graftable monomer and radical-generator) has been found ineffective, on the one hand, for endowing the grafted polyolefin with a sufficient heat stability and, on the other hand, for obtaining a high degree of grafting.

SUMMARY OF THE INVENTION

The present invention is aimed at overcoming the above-mentioned disadvantages by providing a new and simple process which makes it possible, in a single stage, to obtain a grafted and stabilized linear olefin polyolefin exhibiting a high degree of grafting and a high heat stability at the same time. Another objective of the invention is to modify the properties of linear olefin polyolefins by grafting in order to improve their performance as adhesive or compatibilizing agent.

DETAILED DESCRIPTION OF THE INVENTION

The Applicant has noticed that the choice of the zone into which an antioxidant additive is introduced is preponderant in order to obtain a grafted linear olefin polyolefin of increased heat stability.

As a result, the invention relates to a continuous process for grafting a polyolefin within a melt including a polyolefin of linear olefin containing from 2 to 8 carbon atoms, a graftable functional monomer and a radical-generator, in an extruder including at its exit a compression zone preceding a discharge zone; according to the invention at least one antioxidant additive is introduced into the melt not later than before the latter enters the compression zone of the extruder.

For the purpose of the present invention an extruder is intended to denote any continuous device including a feed zone and, at its exit, a discharge zone preceded by a compression zone, the latter forcing the melt to pass through the discharge zone.

The aim of the process according to the invention is especially to modify the properties of the polyolefin by grafting in an extruder. The latter generally includes especially the following parts:

(1) a main feed hopper at the entry of the extruder,
(2) optionally one or more delayed-feed devices which make it possible to introduce the polyolefin, the monomer and the generator separately,
(3) one or more screw members permitting the propagation of the material to be extruded,
(4) optionally one or more blending members permitting the mixing of the material to be extruded, it being possible for the screw members and the blending members optionally to alternate,
(5) one or more heating zones allowing the polyolefin to melt in order that the grafting reaction may take place essentially in a melt,
(6) a degassing zone in order to remove the excessive quantities of unreacted generator and monomer and, optionally, byproducts generated during the extrusion,
(7) at the exit, a compression zone followed by a discharge zone, the function of the compression zone being to compress the material to be extruded in order to force it through the discharge zone of the extruder,
(8) a delayed-feed device arranged at a spot situated after the introduction of the graftable monomer and of the radical-generator, where the stock including the polyolefin, the monomer and the generator is already molten, and before the material to be extruded enters the abovementioned compression zone (7).

Parts (1) to (7) are not necessarily arranged in this order.

The discharge zone of the extruder may be followed by a granulating device or a device which gives the extruded material a profiled form such as a film or a pipe. In most cases the discharge zone of the extruder is followed by a granulating device.

Any known extruder may be employed for this purpose, provided that it permits the delayed introduction of the antioxidant additive, as described in point (8) above.

Extruders which can be suitable in the process according to the invention are especially the extruders of the single-screw type, extruders of the coblender type such as, for example, the extruders marketed by the Buss company, extruders of the interpenetrating or noninterpenetrating corotative twin-screw type, extruders of the interpenetrating or noninterpenetrating counterrotative twin-screw type, and extruders of the multiscrew type. An extruder of the coblender or of the interpenetrating corotative twin-screw type is preferably employed.

In the process according to the invention the polyolefin, the graftable functional monomer and the radical-generator are introduced into the extruder. These three reactants may be introduced simultaneously, optionally by mixing them beforehand, preferably dry and at ambient temperature, for example in a mechanical mixer. These three reactants may also be introduced separately in any order, for example by first of all introducing the polyolefin and then the monomer and the generator simultaneously, the monomer and the generator being optionally premixed. It is also possible first of all to introduce the polyolefin and the monomer, optionally after premixing them, and then to add the generator. It is also possible to introduce the three reactants in three successive stages, for example first the polyolefin, then the monomer and next the generator. It may be found advantageous to introduce the monomer and the generator (separately or simultaneously) after the melting of the polyolefin, in order to optimize the homogenization of the mixture.

In an advantageous embodiment of the process according to the invention a small quantity of stabilizing agent, called "prestabilizing agent" hereinafter, is added to the polyolefin before or at the time when the latter is introduced into the extruder and therefore before the introduction of the antioxidant additive. This is found to be particularly effective when the polyolefin used in the process according to the invention is a virgin polyolefin such as it leaves the polymerization reactor without subsequent treatment. In this embodiment the function of the prestabilizing agent is to protect the polyolefin against any degradation already at the melting stage.

In the process according to the invention it is essential that the introduction of the antioxidant additive should take place with a delay, namely in a delayed and separate feed stage, at the time when the graftable functional monomer and the radical-generator have already been introduced and are present within the melt including the polyolefin, the graftable monomer and the radical-generator, and before the melt has entered the compression zone preceding the discharge zone of the extruder. If the introduction of the antioxidant additive takes place at the same time as or before the introduction of one of the other reactants, or else before the stock melts, or else at the same time as or after the entry of the melt into the abovementioned compression zone, a grafted polyolefin exhibiting a high degree of grafting and a high heat stability at the same time is not obtained. "Delayed introduction of the antioxidant additive" is intended to denote the introduction of the antioxidant additive(s) in one lot or in the form of stagewise introduction into the melt not later than before the latter enters the compression zone of the extruder.

In a particular embodiment of the process according to the invention a first portion of the polyolefin is introduced into the main feed hopper at the entry of the extruder and a second portion of the polyolefin, with a delay, simultaneously with the antioxidant additive. The latter is then advantageously premixed with the second portion of the polyolefin.

In the process according to the invention the grafting of the polyolefin by means of the graftable functional monomer under the effect of free radicals produced by the generator is performed at a temperature which is higher than the melting temperatures of the polyolefin and of the grafted polyolefin, which is lower than the decomposition temperatures of the polyolefin and the grafted polyolefin, and at which the radical-generator produces sufficient free radicals to effect the grafting. The temperature consequently depends on the nature of the polyolefin, of the grafted polyolefin and of the radical-generator. The temperature is generally at least 100° C., in most cases at least 130° C., in particular at least 140° C. The work is generally done at a temperature not exceeding 400° C., in most cases not exceeding 300° C. and more particularly not exceeding 250° C.

The time needed to perform the grafting in the process according to the invention depends on the reactant quantities used, the temperature, the chemical nature of the reactants (polyolefin, monomer, generator), the extruder type employed, because the latter determines the effectiveness of mixing and of contact between the reactants, the speed of rotation of the extruder screw(s) and the extruder throughput. The time is generally from 1 second to 1 hour, preferably from 5 seconds to 30 minutes, more particularly from 10 seconds to 10 minutes. Periods of not more than 5 minutes are generally largely sufficient for producing a grafted linear olefin polyolefin with a high degree of grafting, which is heat-stable.

For the purpose of the present invention a polyolefin is intended to denote one or more polyolefins to which there may have been added a thermoplastic polymer such as, for example, a polystyrene, a polyamide and a polyvinyl chloride. However, it is preferred to use a polyolefin alone. Similarly, graftable functional monomer and radical-generator are intended to denote one or more graftable functional monomers and one or more radical-generators respectively. In most cases only one radical-generator is employed. The use of a single graftable functional monomer is sometimes desired.

The polyolefins which may be employed in the process according to the invention are polymers of linear olefins containing from 2 to 8 carbon atoms, such as ethylene, propylene, 1-butene, 1-pentene, 1-hexene and 1-octene. The linear olefins preferably contain from 2 to 6 carbon atoms, more particularly from 2 to 4 carbon atoms.

The polyolefins may be selected from the homopolymers of the abovementioned olefins and from the copolymers of these olefins, in particular copolymers of ethylene or propylene with one or more comonomers. The comonomers are advantageously chosen from the olefins described above and from diolefins containing from 4 to 18 carbon atoms, such as 4-vinylcyclohexene, dicyclopentadiene, methylene- and ethylidenenorbornene, 1,3-butadiene, isoprene and 1,3-pentadiene.

The polyolefins are preferably polyethylene, polypropylene, ethylene copolymers, propylene copolymers and mixtures thereof.

Ethylene copolymers are particularly suitable, especially those containing from 0.01 to 5% by weight of an alpha-olefin containing up to 12 carbon atoms, for example butene or hexene.

The polyolefin particularly preferred is polyethylene and, more particularly, high-density polyethylene. The latter advantageously has a standard density of at least 935 kg/m$^3$, in particular of at least 940 kg/m$^3$. The standard density generally does not exceed 960 kg/m$^3$, preferably 955 kg/m$^3$. In addition, the polyethylene usually has a melt index (measured at 190° C. under a 2.16 kg load according to ISO standard 1133-1991) of at least 0.1 g/10 min, preferably of at least 1 g/10 min. In most cases the melt index does not exceed 40 g/10 min, more particularly 35 g/10 min.

The function of the graftable functional monomer used in the process according to the invention is to modify the properties of the polyolefin by grafting onto the polyolefin under the effect of free radicals produced by the radical-generator. The graftable functional monomer is generally a compound containing a vinyl unsaturation and optionally one or a number of aromatic nuclei and/or one or more carbonyl groups. The graftable monomer may be chosen, for example, from mono- or dicarboxylic unsaturated acids and their derivatives or the unsaturated mono- or dicarboxylic acid anhydrides and their derivatives. The graftable monomers preferably contain from 3 to 20 carbon atoms. Acrylic acid, maleic anhydride, 1-dodecene, styrene, vinylpyridine, divinylbenzene, 1,4-hexadiene and their mixtures may be mentioned as typical examples. Good results can be obtained with maleic anhydride, styrene, divinylbenzene and their mixtures. Maleic anhydride is very particularly preferred.

The quantity of graftable functional monomer used in the process according to the invention depends on the properties which it is intended to obtain in the grafted polyolefin, the quantity of radical-generator used and the residence time of the mixture in the extruder. It is generally sufficient to permit an improvement in the properties of the grafted polyolefin obtained. In practice there is no interest in using an excessive quantity because any excess beyond the quantity needed to obtain the maximum degree of grafting does not bring about any improvement in the finished product. The quantity is usually at least 0.01 part by weight per 100 parts by weight of polyolefin; it is preferably at least 0.1 part by weight; values of at least 0.5 parts by weight are the most commonplace. In general the quantity does not exceed 10 parts by weight per 100 parts by weight of polyolefin; in most cases it does not exceed 8 parts by weight, values not exceeding 5 parts by weight being those most recommended, for example approximately 2.

The grafting reaction in the process according to the invention takes place under the effect of a radical-generator. Organic peroxides are preferably employed as radical-generators. The latter advantageously have a half-life of at least 1 minute at 170° C. As typical examples there may be mentioned t-butyl cumyl peroxide, α,α'-bis(t-butylperoxyisopropyl)benzene, 3,5-bis(t-butylperoxy)3,5-dimethyl-1,2-dioxolane, di-t-butyl peroxide, 2,5-dimethyl-2,5-di-t-butylperoxyhexane, p-menthane hydroperoxide, pinane hydroperoxide, diisopropylbenzene mono-α-hydroperoxide, cumene hydroperoxide, t-butyl hydroperoxide and mixtures thereof. The preferred radical-generators are α,α'-bis(t-butylperoxyisopropyl)benzene and 2,5-dimethyl-2,5-di-t-butylperoxyhexane.

The radical-generator is generally used in the process according to the invention in a sufficient quantity to make it possible to effect the grafting. Furthermore, it is desirable that the quantity should not exceed the minimum quantity needed because any excess of radical-generator results in a degradation of the polyolefin. The quantity is usually at least 0.005 parts by weight per 100 parts by weight of polyolefin; it is in particular at least 0.01 part by weight, values of at least 0.02 parts by weight being the most advantageous ones. In general the quantity does not exceed 1 part by weight per 100 parts by weight of polyolefin, preferably 0.5 parts by weight, values of not more than 0.1 being the most recommended ones, for example approximately 0.04 parts by weight.

The antioxidant additive used in the process according to the invention may be any known antioxidant for polyolefins. It may, for example, be selected from the compounds containing a sterically hindered phenol group, from phosphorus compounds and from compounds containing a thioether group. Good results are obtained with compounds containing a sterically hindered phenol group and phosphorus compounds. A compound containing a sterically hindered phenol group is preferably employed. By way of compounds containing a sterically hindered phenol group it is possible to employ, for example, pentaerythrityl tetrakis (3,5-di-t-butyl-4-hydroxyphenyl propionate), stearyl β-(3,5-di-t-butyl-4-hydroxyphenyl)propionate, N,N'-bis[3-(3',5'-di-t-butyl-4'-hydroxyphenyl)propionyl]hexamethylenediamine, bis(β-3,5-di-t-butyl-4-hydroxyphenylethyl)suberate, diethyl 3,5-di-t-butyl-4-hydroxybenzylphosphonate and calcium bis-[ethyl(3, 5-di-t-butyl-4-hydroxybenzyl)phosphonate]. By way of phosphorus compounds it is possible to use, for example, tris(2,4-di-t-butylphenyl) phosphite, tris(p-nonylphenyl) phosphite, tris(2,4-dinonylphenyl)phosphite and tetrakis(2, 4-di-t-butylphenyl) 4,4'-biphenylylenediphosphonite. As compounds containing a thioether group, those involved may be, for example, distearyl thiodipropionate and dilauryl thiodipropionate. A number of antioxidant additives may, of course, be used simultaneously. When an alimentary application is intended for the stabilized grafted polyolefin, compounds containing a sterically hindered phenol group and phosphorus compounds are preferably employed, since compounds containing a thioether group are less suitable for alimentary applications. Pentaerythrityl tetrakis (3,5-di-t-butyl-4-hydroxyphenyl propionate), tris(2,4-di-t-butylphenyl)phosphite and their mixtures are particularly suitable.

The function of the antioxidant additive used in the process according to the invention is to neutralize the excess of radicals present in the extruder and to impart heat stability to the grafted polyolefin when it is subsequently employed. The total quantity of antioxidant additive used consequently depends on the quantity of radical-generator used, on the intended application for the grafted polyolefin, because it determines the required stability range, on the nature of the polyolefin and on the effectiveness of the antioxidant additive. The total quantity is generally at least 0.01 part by weight per 100 parts by weight of polyolefin; it is usually at least 0.05 parts by weight, quantities of at least 0.1 part by weight being the most advantageous ones. The total quantity is in most cases not more than 10 parts by weight per 100 parts by weight of polyolefin, preferably not more than 5 parts by weight, quantities of not more than 1 part by weight being the most commonplace, for example approximately 0.5 parts by weight.

The antioxidant additive is advantageously used in the process according to the invention in the form of a powder, optionally premixed with a portion of the polyolefin.

The prestabilizing agent employed in the advantageous embodiment of the process according to the invention, described above, may be chosen from conventional stabilizing agents such as the anti-UV agents, antiacid agents, antioxidant agents and their mixtures. Antioxidant agents are especially preferred.

The total quantity of prestabilizing agent used this embodiment must be small, in order not to compromise the effectiveness of the grafting of the polyolefin. Generally it does not exceed 0.5 part by weight per 100 parts by weight of polyolefin; in most cases it does not exceed 0.4 parts by weight, quantities not exceeding 0.3 parts by weight being the preferred ones, for example approximately 0.2 parts by weight. The total quantity of prestabilizing agent is usually at least 0.01 part by weight per 100 parts by weight of polyolefin, preferably at least 0.03 parts by weight, more particularly at least 0.05 parts by weight.

In the course of the extrusion in the process according to the invention, usual additives for polyolefins may be incorporated at any time, such as, for example, the abovementioned stabilizing agents other than the antioxidant additives, antistatic agents, organic or inorganic colorants (such as, for example, titanium or iron oxide) and filling materials such as glass fibres, provided that they do not interfere with the grafting reaction and do not affect the heat stability imparted by the antioxidant additive.

The process according to the invention makes it possible to obtain stabilized grafted polyolefins exhibiting a high degree of grafting and a high heat stability at the same time. The stabilized grafted polyolefins thus obtained find an advantageous use as adhesive, for example between a layer of polyolefin which is nonpolar in nature and a layer of polar resin, and as compatibilizing agent, for example between a polyolefin matrix and a filler material such as glass fibres.

The present invention consequently also relates to the stabilized grafted polyolefins obtained by means of the process in accordance with the invention, described above.

The preferred stabilized grafted polyolefins are those obtained from polyethylene. These stabilized grafted polyolefins advantageously exhibit a standard density (measured according to ISO standard 1183-1987) of at least 930 kg/m$^3$, more particularly of at least 935 kg/m$^3$. In general the standard density does not exceed 960 kg/m$^3$, more precisely 955 kg/m$^3$. These stabilized grafted polyolefins preferably exhibit a melt index (measured according to ISO standard 1133-1991 under a 5 kg load and at 190° C.) of at least 0.05 g/10 min, in most cases of at least 0.1 g/10 min, values of at least 0.15 g/10 min being the most advantageous ones. The melt index usually does not exceed 20 g/10 min, preferably 10 g/10 min, more particularly 5 g/10 min.

In most cases the stabilized grafted polyolefins in accordance with the invention exhibit a grafted functional monomer content of at least 0.01 part by weight per 100 parts by weight of polyolefin, in particular of at least 0.1 part by weight, contents of at least 0.5 parts by weight being the most commonplace. The content is usually not more than 10 parts by weight per 100 parts by weight of polyolefin, preferably not more than 8 parts by weight, more precisely not more than 5 parts by weight, for example approximately 2 parts by weight.

The stabilized grafted polyolefins in accordance with the invention include one or more antioxidant additives, in general in a total quantity of at least 0.01 part by weight per 100 parts by weight of polyolefin, preferably of at least 0.05 parts by weight, more particularly of at least 0.1 part by weight. In most cases the total quantity does not exceed 10 parts by weight per 100 parts by weight of polyolefin, more precisely not more than 5 parts by weight, quantities of not more than 1 part by weight being the most favourable ones, for example approximately 0.5 part by weight.

The invention also relates to the stabilized grafted polyethylene exhibiting one or more characteristics specified above.

The invention also relates to a continuous grafting process within a melt providing poorly cross-linked grafted polyolefins.

To this end, the invention relates to a continuous process for grafting a polyolefin within a melt including the polyolefin, a graftable functional monomer and a radical-generator, in an extruder including at the entry a feed zone into which the polyolefin, the graftable functional monomer and the radical-generator are introduced at least partially, and at its exit a discharge zone; according to the invention, between the discharge zone and the spot situated midway along the extruder, the extruder includes one or several blending members followed by one or several lefthanded-thread conveying members.

This process makes it possible to depolymerize the crosslinked materials generated during the grafting and thus to reduce the viscosity of the grafted polyolefin, and this makes the grafted polyolefin particularly suitable for being employed as coupling agent between a polyolefin matrix and glass fibres reinforcing the matrix. This process is consequently called "low-crosslinking grafting process" hereinafter.

A spot situated midway along the extruder is intended to denote the spot situated in the middle between the feed zone and the discharge zone.

A blending member is intended to denote a member of the extruder screw the function of which is to heat the material to be extruded by shearing action and to heat it to melting. This member is also employed for homogenizing the material to be extruded, dispersing additives and/or fillers in the material or promoting the contact between the reactants used.

A lefthanded conveying member is intended to denote a member of the extruder screw which conveys the material in the direction opposite to that of the righthanded conveying members. The function of these righthanded conveying members is to propagate the material. The lefthanded conveying member therefore opposes the general movement in the extruder and creates a kind of dam, the effect of which is to fill the members situated upstream of the lefthanded conveying member, namely the blending member.

One of the essential characteristics of the low-crosslinking grafting process lies in the sequence of one or of several blending members followed by one or several lefthanded conveying members, this sequence being situated between the spot situated midway and the exit of the extruder, that is to say in the second half of the extruder.

The extruder used in the low-crosslinking grafting process may optionally include several sequences of at least one blending member followed by at least one lefthanded conveying member, which are situated in the second half of the extruder.

The feed zone of the extruder used in the low-crosslinking grafting process is generally made up of righthanded conveying members.

The discharge zone of the extruder may be followed by a granulating device or a device giving the extruded material a profiled shape such as a film or a pipe. In most cases the discharge zone of the extruder is followed by a granulating device.

Besides the feed zone, the discharge zone and one or several blending members followed by one or several lefthanded conveying members, the extruder used in the low-crosslinking grafting process generally comprises the following zones: p1 a melting zone. The latter is usually situated immediately after the feed zone. In most cases it is made up of blending members. These blending members are preferably followed by at least one lefthanded conveying member which is used to fill the melting zone in order to complete the melting reaction;

a compression zone. The latter usually precedes the discharge zone. Its function is to push the material towards the discharge zone and hence towards the exit of the extruder. It is generally made up of righthanded conveying members.

In a preferred alternative form the extruder additionally comprises:

an additional reaction zone. The latter is generally arranged immediately after the melting zone. Its function is to convey the material to be extruded with the aid of righthanded conveying members and optionally to homogenize the material with the aid of blending members. It is preferable that, in the additional reaction zone, the total length of the blending members should not exceed 20% of the total length of the righthanded conveying members;

a degassing zone. The function of the latter is to remove the volatile reactants not converted during the grafting reaction. It is advantageously arranged after the reaction zone and before the compression zone. In most cases it consists of righthanded conveying members. It is preferably preceded by a lefthanded conveying member which, being filled with material, acts as a partition between the reaction zone and the degassing zone.

In a particular embodiment of the low-crosslinking grafting process according to the invention, an extruder is employed including at its exit a compression zone preceding the discharge zone, and at least one antioxidant additive is introduced into the melt not later than before the latter enters the compression zone, as described in the continuous process for grafting a polyolefin above. In this embodiment the sequence of one or several blending members followed by one or several lefthanded conveying members is advantageously arranged between the spot where the antioxidant additive is introduced and the discharge zone.

In the low-crosslinking grafting process the nature of the graftable functional monomer, of the radical-generator and the quantities in which they are used, as well as the operating conditions (temperature and time) are in accordance with those described above for the continuous grafting process.

In the low-crosslinking grafting process it is optionally possible to use one or a number of usual additives and/or a prestabilizing agent, such as described above for the continuous grafting process.

The polyolefins usable in the low-crosslinking grafting process may be chosen from linear or branched olefin polymers. The olefins generally contain up to 20 carbon atoms, in particular up to 12 carbon atoms, preferably up to 8 carbon atoms. Ethylene, propylene, 1-butene, 1-pentene, 3-methyl-1-butene, 1-hexene, 3- and 4-methyl-1-pentenes and 1-octene may be mentioned as examples of olefins. The preferred olefins are the linear olefins containing from 2 to 8 carbon atoms.

The polyolefins may be selected from the homopolymers of the abovementioned olefins and from the copolymers of these olefins, in particular from the homopolymers of ethylene or propylene and the copolymers of ethylene or of propylene with one or more comonomers. The comonomers are advantageously chosen from the olefins described above and from the diolefins containing from 4 to 18 carbon atoms.

The polyolefins are preferably polyethylene, polypropylene, ethylene copolymers, propylene copolymers and mixtures thereof.

The polyolefin which is particularly preferred is polyethylene and, more particularly, high-density polyethylene.

The invention also relates to a process for the treatment of granules of a grafted polyolefin in order to obtain granules exhibiting a high stability to moisture, reflected in a relatively insignificant change in the melt index even after long periods of storage in the presence of moisture.

To this end the invention relates to a process for the treatment of granules of a grafted polyolefin, according to which the granules of grafted polyolefin are brought into contact with a gaseous medium containing water vapour.

The function of bringing the granules of grafted polyolefin into contact with a gaseous medium containing water vapour (called "water vapour treatment" hereinafter) is to make the water react with the functional monomers which are grafted onto the polyolefin and preferably so as to saturate the grafted polyolefin with water.

The water vapour treatment may be carried out by any suitable known means, provided that it makes it possible to bring the water vapour into contact with the granules so as to make the water react with the grafted functional monomers. It may be carried out in a static system, for example in a closed storage vessel into which the granules are poured and in which they are kept in an atmosphere containing water vapour. Alternatively, it may be performed in a dynamic system, in which the granules are subjected to purging with a gas stream containing water vapour, such as in a stripping column, or in which the granules are entrained (or fluidized) by a gas stream containing water vapour, such as in a fluidized-bed reactor. It is preferred to perform the water vapour treatment in a static system.

The water vapour treatment is carried out by bringing the granules into contact with a gaseous medium containing water vapour, in which the water vapour may be diluted in an inert gas such as nitrogen and air. It is desirable to operate at a water vapour concentration such that the reaction between the water and the grafted functional monomer is promoted. The operation is preferably carried out in a gaseous medium saturated with water vapour at the working temperature. It is recommended, furthermore, that the inert gas should contain less than 10% (in particular less than 5%) by volume of oxygen, in order to avoid the degradation of the polyolefin by oxidation.

The operating conditions (temperature, pressures, time) in which the water vapour treatment is carried out may vary to a wide extent. They are preferably chosen so that the water vapour is present in the gaseous medium and so that a reaction, preferably as complete as possible, may take place between the water and the grafted functional monomers while avoiding the melting and/or the degradation of the polyolefin.

The partial pressure of water vapour in the gaseous medium is generally at least 0.01 MPa, in particular at least 0.5 MPa; values of at least 0.1 MPa are preferred. The partial pressure of the water vapour is in most cases not more than 1 MPa, more especially not more than 0.5 MPa, values of not more than 0.2 MPa being recommended. The operation is preferably carried out at a partial pressure of water vapour of approximately 0.1 MPa.

The water vapour treatment is generally performed at a temperature of at least 80° C., more precisely of at least 90° C., values of at least 100° C. being the most commonplace. The temperature is usually not more than 200° C., in particular not more than 170° C., values of not more than 140° C. being advantageous. The operation is preferably carried out at a temperature of approximately 100° C.

The duration of the water vapour treatment is generally at least 1 min, more particularly at least 2 min, periods of at least 5 min being the most commonplace. The duration generally does not exceed 5 h, more precisely 1 h, durations of at most 30 min being preferred.

The polyolefins usable in the process for the treatment of granules of a grafted polyolefin may be chosen from linear or branched olefin polymers. The olefins generally contain up to 20 carbon atoms, in particular up to 12 carbon atoms, preferably up to 8 carbon atoms. Ethylene, propylene, 1-butene, 1-pentene, 3-methyl-1-butene, 1-hexene, 3- and 4-methyl-1-pentenes and 1-octene may be mentioned as examples of olefins. The preferred olefins are linear olefins containing from 2 to 8 carbon atoms.

The polyolefins may be chosen from the homopolymers of the abovementioned olefins and from the copolymers of these olefins, in particular from ethylene or propylene homopolymers and the copolymers of ethylene or propylene with one or more comonomers. The comonomers are advantageously chosen from the olefins described above and from the diolefins containing from 4 to 18 carbon atoms.

The polyolefins are preferably polyethylene, polypropylene, ethylene copolymers, propylene copolymers and mixtures thereof.

The polyolefin particularly preferred is polyethylene and more particularly high-density polyethylene.

The process for the treatment of granules according to the invention makes it possible to obtain granules of a grafted polyolefin whose properties (in particular the melt index) do not change significantly in the course of time when the granules are exposed to moisture (for example when they are stored). The process for the treatment of granules according to the invention consequently makes it possible to obtain granules of grafted polyolefin which do not require any precaution in storage with regard to moisture.

The grafted polyolefin granules brought into contact with a gaseous medium containing water vapour according to the process of the invention may be obtained by any known manner.

In a particular embodiment of the process for the treatment of granules according to the invention the grafted polyolefin granules are prepared in an extruder within a melt including the polyolefin, a graftable functional monomer and a radical-generator.

The extruder employed in the particular embodiment generally includes the parts (1) to (7) described above, the discharge zone being furthermore followed by a granulating device.

The nature of the graftable functional monomer, of the radical-generator and the quantities in which they are used in this embodiment, as well as the operating conditions (temperature and time), are consistent with those described above for the continuous grafting process.

Particularly advantageous results are obtained in this embodiment when the graftable functional monomer used is chosen from unsaturated anhydrides of a mono- or dicarboxylic acid. In this case the granules originating from the water vapour treatment may be advantageously employed as adhesive, for example between a layer made of polyolefin, which is nonpolar in nature, and a layer made of polar resin, in particular of a resin containing epoxy groups. Maleic anhydride is particularly suitable.

In the particular embodiment it is optionally possible to use, in the preparation of the grafted polyolefin granules, one or more usual additives and/or a prestabilizing agent or else an antioxidant additive such as those described above for the continuous grafting process.

In a first alternative form of this particular embodiment the grafted polyolefin is obtained in an extruder including, at its exit, a compression zone preceding a discharge zone, and at least one antioxidant additive is introduced into the melt not later than before the latter enters the compression zone of the extruder, as described above. In this embodiment the discharge zone of the extruder is followed by a granulating device, at the outlet of which grafted polyolefin granules are collected and are subsequently brought into contact with a gaseous medium containing water vapour in the way described above.

The extruder employed in the first alternative form advantageously includes the parts (1) to (8) described above, the discharge zone of the extruder being furthermore followed by a granulating device.

In a second alternative form of this particular embodiment the grafted polyolefin is obtained in an extruder including, at the entry, a feed zone into which the polyolefin, the graftable functional monomer and the radical-generator are introduced at least partially, a discharge zone at its exit and, between the discharge zone and the spot situated midway along the extruder, one or several blending members followed by one or several lefthanded conveying members, as described above in the low-crosslinking grafting process.

The extruder employed in the second alternative form advantageously includes the parts (1) to (7) described above, the discharge zone of the extruder being additionally followed by a granulating device.

In a third alternative form of the particular embodiment the grafted polyolefin is obtained in an extruder combining the use of a sequence of one or several blending members which are followed by one or several lefthanded conveying members (as in the above-mentioned first alternative form) with the introduction of an antioxidant additive into the melt not later than before the latter enters the compression zone (as in the abovementioned second alternative form).

The extruder employed in the third alternative form advantageously includes the parts (1) to (8) described above, the discharge zone of the extruder being additionally followed by a granulating device.

The present invention also relates to granules of a grafted polyolefin whose melt index exhibits a stability of at least 0.90, defined as the ratio of, on the one hand, the melt index measured after storage of the granules for 48 hours at ambient temperature, at atmospheric pressure and in a gaseous medium saturated with water vapour, to, on the other hand, the melt index measured immediately after the manufacture of the granules (the manufacture including any subsequent treatment following the granulation) and before storage. In particular, the stability of the melt index is at least 0.95, values of at least 0.97 being recommended. Since the stability of the melt index is defined as a ratio of melt indices, it is independent of the method employed for measuring the melt index, provided that the same method is employed before and after storage.

The preferred grafted polyolefin granules are those obtained from polyethylene. These grafted polyethylene granules advantageously exhibit a standard density (measured according to ISO standard 1183-1987) of at least 930 kg/m$^3$, more particularly at least 935 kg/m$^3$. In general, the standard density does not exceed 960 kg/m$^3$, more precisely 955 kg/m$^3$. These stabilized grafted polyolefins preferably exhibit a melt index (measured according to ISO standard 1133-991 under a 5 kg load and at 190° C.) of at least 0.05 g/10 min, in most cases of at least 0.1 g/10 min, values of at least 0.15 g/10 min being the most advantageous ones. The melt index usually does not exceed 20 g/10 min, preferably 10 g/10 min, more particularly 5 g/10 min.

In most cases the granules of a grafted polyolefin in accordance with the invention exhibit a grafted functional monomer content of at least 0.01 part by weight per 100 parts by weight of polyolefin, in particular at least 0.1 part by weight, contents of at least 0.5 parts by weight being the most commonplace. The content is usually not more than 10 parts by weight per 100 parts by weight of polyolefin, preferably not more than 8 parts by weight, more precisely not more than 5 parts by weight, for example approximately 2 parts by weight.

The granules of grafted polyolefin according to the invention are in most cases characterized by a particle size defined by a mean diameter of at least 0.5 mm, more especially of at least 2 mm, values of at least 1 mm being advantageous. The mean diameter is usually not more than 10 mm, more precisely not more than 7 mm, values of not more than 5 mm being the most commonplace.

EXAMPLES

The examples whose description follows are used to illustrate the invention. Examples 3 to 7, 10 and 14 are given by way of comparison. The meaning of the symbols employed in these examples, the units expressing the quantities referred to, and the methods for measuring these quantities are detailed below.

| | |
|---|---|
| MI2 = | melt index of the polyolefin, measured at 190° C. under a 2.16 kg load according to ISO standard 1133–1991. |
| MI5 = | melt index of the polyolefin, measured at 190° C. under a 5 kg load according to ISO standard 1133–1991. |
| SD = | standard density of the polyolefin, expressed in kg/m31 measured according to ISO standard 1183–1987. |
| DG = | degree of grafting, expressed in parts by weight of grafted functional monomer per 100 parts by weight of polyolefin, measured by infrared spectrometry. |
| IP = | induction period of the oxidation of the polyolefin at 210° C., expressed in minutes. The induction period is measured by a thermal analysis in which the polyolefin is subjected to an oxidation under oxygen at a constant temperature of 210° C. and the time to the appearance of an exothermic phenomenon caused by the oxidation of the polyolefin is measured. The induction period is a measure of the heat stability. |

Example 1 (In Accordance with the Invention)

In this example a polyethylene grafted with maleic anhydride was produced, stabilized by means of an antioxidant additive of the hindered phenol type and of an antioxidant additive of the phosphite type.

This example was produced in an extruder of the coblender type marketed by the Buss company (type MDK/E46B). This extruder was arranged so that it included the following zones in succession:

(1) main feed zone,
(2) heating zone,
(3) first reaction zone provided with a feed orifice,
(4) second reaction zone provided with a feed orifice,
(5) degassing zone making it possible to remove the reactants which have not reacted,
(6) compression zone provided with a feed orifice,
(7) discharge zone, followed by a granulating screw.

This extruder was fed in part (1) at a rate of 10 kg/h with a mixture containing:
100 parts by weight of high-density polyethylene marketed under the name Eltex® B 4020 P by Solvay (exhibiting an MI2 of 1.8 g/10 min and an SD of 951 kg/m$^3$),
2.04 parts by weight of maleic anhydride,
0.04 part by weight of 2,5-dimethyl-2,5-di-t-butylperoxyhexane.

The extruder was also fed through the feed orifice of zone (3) at a rate of 80 g/h with a mixture containing:
100 parts by weight of Eltex® B 4020 P high-density polyethylene,
50 parts by weight of antiacid agent (hydrotalcite coated with stearic acid),
25 parts by weight of antioxidant additive [pentaerythrityl tetrakis(3,5-di-t-butyl-4-hydroxyphenyl propionate)],
25 parts by weight of antioxidant additive [tris(2,4-di-t-butylphenyl)phosphite].

The total quantity of antioxidant additive used was 0.2 part by weight per 100 parts by weight of polyethylene.

The extrusion conditions were:
temperature of zone (2): 200° C.,
temperature of zones (3) and (4): 220° C.,
temperature of zones (5) and (6): 200° C.,
screw temperature: 160° C., speed of rotation of the extruder screw: 150 revolutions/min,
speed of rotation of the granulation screw: 15 revolutions/min.

The product obtained had the following characteristics:
MI5=0.25 g/10 min.
DG=1.4 parts by weight.
IP=4 minutes.

Example 2 (In Accordance with the Invention)

In this example the operations of Example 1 were repeated in the same conditions, except that the second introduction took place in zone (4) instead of in zone (3).

The product obtained had the following characteristics:
MI5=0.17 g/10 min.
DG=1.6 parts by weight.
IP=7 minutes.

Example 3 (For Comparison)

In this example a polyethylene grafted with maleic anhydride was prepared according to the process described in U.S. Pat. No. 4,927,888, in which no antioxidant additive is added.

The operations of Example 1 were repeated, the second introduction in zone (3) being omitted.

The product obtained, containing neither antioxidant additive nor antiacid agent, had the following characteristics:
MI5=0.13 g/10 min.
DG=1.7 parts by weight.
IP≦2 minutes.

Comparison of the results of Example 3 with those obtained in Examples 1 and 2 reveals the progress brought about by the invention insofar as the heat stability to oxygen of the grafted polyolefin (measured by means of the IP) is concerned.

Example 4 (For Comparison)

A polyethylene grafted with maleic anhydride was produced in this example by introducing the antioxidant additive simultaneously with the other reactants (polyolefin, graftable functional monomer, radical-generator) into the main feed zone.

The same extruder as that employed in Example 1 was employed, and in the same extrusion conditions.

The extruder was fed in part (1) at a rate of 10 kg/h with a mixture containing:

100 parts by weight of Eltex® B 4020 P high density polyethylene, 2.05 parts by weight of maleic anhydride, 0.04 part by weight of 2,5-dimethyl-2,5-di-t-butylperoxyhexane, 0.21 part by weight of antiacid agent (hydrotalcite coated with stearic acid), 0.10 part by weight of antioxidant additive [pentaerythrityl tetrakis(3,5-di-t-butyl-4-hydroxyphenyl propionate)], 0.10 part by weight of antioxidant additive [tris(2,4-di-t-butylphenyl phosphite)].

The total quantity of antioxidant additive used relative to the quantity of polyethylene is identical with that in Example 1.

The product obtained had the following characteristics:

MI5=2.4 g/10 min.

DG=0.4 part by weight.

IP≦2 minutes.

Comparison of the results of Example 4 with those obtained in Examples 1 and 2 reveals the progress brought about by the invention insofar as the degree of grafting and the heat stability to oxygen of the grafted polyolefin (measured by means of the IP) are concerned.

Example 5 (For Comparison)

In this example a polyethylene grafted with maleic anhydride was produced by introducing the antioxidant additive into the compression zone preceding the discharge zone of the extruder.

The operations of Example 1 were repeated in the same conditions, except that the second introduction took place in zone (6) instead of in zone (3).

The product obtained had the following characteristics:

MI5=0.17 g/10 min.

DG=1.6 parts by weight.

IP≦2 minutes.

Comparison of the results of Example 5 with those obtained in Examples 1 and 2 reveals the progress brought about by the invention insofar as the heat stability of the grafted polyolefin (measured by means of the IP) is concerned.

Example 6 (For Comparison)

In this example a polyethylene grafted with maleic anhydride was prepared by reactive extrusion, in which the maleic anhydride is introduced with a delay at a time when the stock is already molten and includes especially the polyethylene, the radical generator and the antioxidant additive.

The extruder of Example 1 was employed, which was fed in part (1) at a rate of 9.6 kg/h with a mixture containing:

100 parts by weight of Eltex B 4020 P high-density polyethylene, 0.2 part by weight of antiacid agent (hydrotalcite coated with stearic acid), 0.1 part by weight of antioxidant additive [pentaerythrityl tetrakis(3,5-di-t-butyl-4-hydroxyphenyl propionate)], 0.1 part by weight of an antioxidant additive [tris(2,4-di-t-butylphenyl)phosphite], 0.04 part by weight of 2,5-dimethyl-2,5-di-t-butylperoxyhexane.

The extruder was also fed through the feed orifice of zone (3), at a rate of 0.4 kg/h, with a mixture containing:

100 parts by weight of Eltex B 4020 P high-density polyethylene, 100 parts by weight of maleic anhydride.

The extrusion conditions were those of Example 1.

The product obtained had the following characteristics:

MI5=2.4 g/10 min,

DG=0.1 part by weight,

IP=13 minutes.

Comparison of the results of Example 6 with those obtained in Example 1 reveals the progress brought about by the invention insofar as the degree of grafting is concerned.

Example 7 (For Comparison)

In this example a polyethylene grafted with maleic anhydride was prepared by reactive extrusion in which the graftable functional monomer, the radical-generator and the antioxidant additive are introduced simultaneously with a delay into the molten polyethylene.

The extruder of Example 1 was employed, which was fed in part (1) at a rate of 9.6 kg/h with Eltex B 4020 P high-density polyethylene.

The extruder was also fed through the feed orifice of zone (3) at a rate of 0.4 kg/h with a mixture containing:

100 parts by weight of Eltex B 4020 P high-density polyethylene, 128 parts by weight of maleic anhydride, 12.8 parts by weight of antiacid agent (hydrotalcite coated with stearic acid), 6.4 parts by weight of antioxidant additive [pentaerythrityl tetrakis(3,5-di-t-butyl-4-hydroxyphenyl propionate)], 6.4 parts by weight of antioxidant additive [tris(2,4-di-t-butylphenyl)phosphite]

2.6 parts by weight of 2,5-dimethyl-2,5-di-t-butylperoxyhexane.

The extrusion conditions were as in Example 1.

The product obtained had the following characteristics:

MI5=3.9 g/10 min,

DG=0.6 part by weight,

IP=4 minutes.

Comparison of the results of Example 7 with those obtained in Example 1 reveals the progress brought about by the invention insofar as the degree of grafting is concerned.

Example 8 (In Accordance with the Invention)

In this example a slightly crosslinked polyethylene grafted with maleic anhydride was produced.

An extruder of interpenetrating corotative twin-screw type, marketed by the Werner & Pfleiderer company (type ZSK-40) was employed, including the zones (1) to (7) described in Example 1, as well as a sequence of a blending member followed by a lefthanded conveying member arranged at 70% of the total length of the extruder.

This extruder was fed in zone (1) at a rate of 56 kg/h with a mixture containing:

100 parts by weight of Eltex A 4090 P high-density polyethylene whose melt index MI5 was 11 g/10 min and whose density SD was 951 kg/m³, 0.065 part by weight of 2,5-dimethyl-2,5-di-t-butylperoxyhexane, 0.57 part by weight of maleic anhydride, 0.14 part by weight of antioxidant additive [pentaerythrityl tetrakis(3,5-di-t-butyl-4-hydroxyphenyl propionate)], 0.14 part by weight of antioxidant additive [tris(2,4-di-t-butylphenyl)phosphite], 0.028 part by weight of antiacid agent (calcium stearate).

The extruder was also fed through the feed orifice of zone (3) situated at 40% of the length of the machine, at a rate of 24 kg/h, with a mixture containing:

100 parts by weight of Eltex B 4020 P high-density polyethylene, 0.28 part by weight of antioxidant additive [pentaerythrityl tetrakis(3,5-di-t-butyl-4-hydroxyphenyl propionate)], 0.28 part by weight of antioxidant additive [tris(2,4-di-t-butylphenyl)phosphite, 0.057 part by weight of antiacid agent (hydrotalcite coated with stearic acid).

The extrusion conditions were:

temperature: 210° C., speed of rotation of the extruder screw: 300 revolutions/min.

The product obtained had a melt index MI5 of 20 g/10 min, a degree of grafting DG of 0.36% and an induction period IP of 64 minutes.

Example 9 (In Accordance with the Invention)

In this example a slightly crosslinked polyethylene grafted with maleic anhydride was produced by means of an extruder of the type with interpenetrating corotative twin screws, marketed by the Werner & Pfleiderer company (type ZSK 25), including the zones (1) to (7) of Example 1. The temperature was controlled at 190° C. The speed of rotation of the screws was 300 revolutions/min. In its second half the extruder included a sequence of a blending member followed by a lefthanded conveying member, situated at 73% of its total length.

The mixture which had, per kg, the following composition was introduced at a rate of 12 kg/h into zone (1):

948.6 g of the high-density polyethylene described in Example 1;

0.2 g of 1,3-di[2-tert-butylperoxyisopropyl]benzene;

15 g of maleic anhydride.

The product obtained had the following characteristics:

MI5: 1.5 g/10 min.

DG: 1.14 parts by weight.

Example 10 (For Comparison)

A grafting test was undertaken in general conditions which were identical with those of Example 9, except that the extruder was devoid of the sequence of the blending member followed by the lefthanded conveying member.

The product obtained had the following characteristics:

MI5: 0.2 g/10 min.

DG: 1.36 parts by weight.

Comparison of the results of Examples 9 and 10 shows that the compromise between the degree of grafting and the melt index of the product reached when the extruder has a screw profile permitting reinforced blending in its second half (Example 9) is more favourable. In fact, at comparable degree of grafting, the product of Example 9 is more fluid, and this, on the one hand, improves its processibility and, on the other hand, enables the grafts to react more easily at the interface when the product is to fulfil an adhesive function.

Examples 11 to 13 (In Accordance with the Invention)

a) Preparation of Granules of Grafted Polyethylene

An interpenetrating corotative twin-screw extruder of Werner & Pfleiderer ZSK 58 type, in which the target temperature was set at 210° C. and in which the screws rotate at the rate of 175 rev/min, including the zones (1) to (7) of Example 1 was fed in zone (1) at a rate of 70 kg/h with a mixture containing:

100 parts by weight of Eltex B 4020 P high-density polyethylene 2.14 parts by weight of maleic anhydride 0.14 part by weight of antioxidant additive [pentaerythrityl tetrakis(3,5-di-t-butyl-4-hydroxyphenyl propionate)]

0.14 part by weight of antioxidant additive [tris(2,4-di-t-butylphenyl)phosphite]

0.3 part by weight of antiacid agent (calcium stearate)

0.09 part by weight of 1,3-di(2-t-butylperoxyisopropyl)benzene.

Into zone (3) the following mixture was introduced at a rate of 30 kg/h, containing:

100 parts by weight of Eltex B 4020 P high-density polyethylene 0.65 part by weight of antioxidant additive [pentaerythrityl tetrakis(3,5-di-t-butyl-4-hydroxyphenyl propionate)]

0.65 part by weight of antioxidant additive [tris(2,4-di-t-butylphenyl)phosphite]

0.13 part by weight of antiacid agent (hydrotalcite coated with stearic acid).

The product was granulated at the extruder exit.

The granules of polyethylene grafted with maleic anhydride had the following characteristics:

MI5=1.6 g/10 min,

DG=0.8 part by weight

IP=32 minutes.

b) Water Vapour Treatment 250 g of the granules obtained in (a) were introduced into a 1-l closed receptacle containing 0.3 l of boiling water. After 30 minutes, 60 minutes and 120 minutes respectively, the granules were separated from the water and dried in vacuum at 80° C. for 1 hour. The granules thus treated had the following characteristic respectively:

| Example No. | Time | MI5 |
| --- | --- | --- |
| 11 | 30 min | 0.58 |
| 12 | 60 min | 0.46 |
| 13 | 120 min | 0.51 | c) Exposure to Moisture

The granules were then exposed to an atmosphere including 53% of relative moisture for a period of 40 days and at 22° C. At the end of this exposure the melt index remained unchanged.

Example 14 (For Comparison)

The operations of Examples 11 to 13 were repeated except for the water vapour treatment, which was omitted.

During the exposure to moisture (after 1, 2, 4, 6, 10, 20 and 40 days respectively) the melt index changed as follows:

|     | 1 d. | 2 d. | 4 d. | 6 d. | 10 d. | 20 d. | 40 d. |
| --- | --- | --- | --- | --- | --- | --- | --- |
| MI5 | 1.4 | 1.4 | 1.3 | 1.1 | 1.0 | 1.1 | 0.9 |

Comparison of the results of Example 14 with those obtained in Examples 11 to 13 reveals the progress brought about by the invention insofar as the change in the melt index is concerned. In fact, in Examples 11 to 13 the melt index of the grafted polyethylene after the water vapour treatment remains unchanged whereas, in Example 14, the melt index changes in the course of time.

What is claimed is:

1. A stabilized grafted polyethylene exhibiting a standard density (measured according to ISO standard 1183-1987) of 930 to 960 kg/m$^3$, a melt index (measured according to ISO standard 1133-1991 under a 5 kg load and at 190° C.) of 0.05 to 20 g/10 min, a graftable functional monomer content of 0.01 to 10 parts by weight per 100 parts by weight of polyethylene and a total antioxidant additive content of 0.01 to 10 parts by weight per 100 parts by weight of polyethylene.

2. A continuous process for grafting a polyolefin within a melt including the polyolefin, a graftable functional monomer and a radical-generator, in an extruder including at the entry a feed zone into which the polyolefin, the graftable functional monomer and the radical-generator are introduced at least partially, and at its exit a discharge zone and including, between the discharge zone and the spot situated midway along the extruder, one or several blending members followed by one or several lefthanded conveying members.

3. The process according to claim 2, wherein the extruder additionally comprises a melting zone situated immediately after the feed zone, and a compression zone preceding the discharge zone.

4. The process according to claim 3, wherein the melting zone consists of blending members, and the compression zone of righthanded conveying members.

5. The process according to claim 3, wherein the extruder additionally comprises an additional reaction zone arranged immediately after the melting zone, and a degassing zone situated after the reaction zone and before the compression zone.

6. The process according to claim 5, wherein the additional reaction zone is made up of righthanded conveying members and of blending members, and the degassing zone of righthanded conveying members.

7. The process according to claim 6, wherein, the total length of the blending members in the additional reaction zone, does not exceed 20% of the total length of the righthanded conveying members.

8. The process according to claim 2, wherein the extruder includes, at its exit, a compression zone preceding the discharge zone, and wherein at least one antioxidant additive is introduced into the melt not later than before the latter enters the compression zone.

9. The process according to claim 8, wherein the sequence of one or several blending members which are followed by one or several lefthanded conveying members is arranged between the place where the antioxidant additive is introduced and the discharge zone.

10. A process for the treatment of granules of a grafted polyolefin, according to which the granules of grafted polyolefin are brought into contact with a gaseous medium saturated with water vapor at a temperature of at least 80° C. for at least one (1) minute.

11. The process according to claim 10, wherein the partial pressure of water vapor in the gaseous medium is approximately 0.1 Mpa.

12. The process according to claim 10, wherein the granules are brought into contact with a gaseous medium containing water vapour at a temperature of at least 90° C. and not more than 200° C.

13. The process according to claim 10, wherein the graftable functional monomer is chosen from the group consisting of unsaturated anhydrides of a mono- or dicarboxylic acid.

14. The process according to claim 10, wherein the grafted polyolefin is prepared in an extruder within a melt including the polyolefin, a graftable functional monomer and a radical-generator.

15. The process according to claim 14, wherein the grafted polyolefin is prepared in an extruder including, at its exit, a compression zone preceding a discharge zone, and wherein at least one antioxidant additive is introduced into the melt not later than before the latter enters the compression zone of the extruder.

16. The process according to claim 14, wherein the extruder includes, at the entry, a feed zone into which the polyolefin, the graftable functional monomer and the radical-generator are introduced at least partially, a discharge zone at its exit and, between the discharge zone and the spot situated midway along the extruder, one or several blending members followed by one or several lefthanded conveying members.

17. Granules of grafted polyolefin exhibiting a melt index of stability of at least 0.90, defined as the ratio of, on the one hand, the melt index measured after storage of the granules for 48 hours at ambient temperature, at atmospheric pressure and in a gaseous medium saturated with water vapour, to, on the other hand, the melt index measured immediately after the manufacture of the granules (the manufacture including any subsequent treatment following the granulation) and before storage.

18. The Granules according to claim 17, being obtained from polyethylene and exhibiting a standard density (measured according to ISO standard 1183-1987) of 930 to 960 kg/m$^3$, a melt index (measured according to ISO standard 1133-1991 under a 5 kg load and at 190° C.) of 0.05 to 20 g/10 min and a grafted functional monomer content of 0.01 to 10 parts by weight per 100 parts by weight of polyethylene.

19. The granules according to claim 17 obtained by a process according to which the granules of grafted polyolefin are brought into contact with a gaseous medium containing water vapour.

20. A stabilized grafted polyolefin exhibiting a grafted functional monomer content from 0.01 to 10 parts by weight and a total antioxidant content from 0.01 to 10 parts by weight, each per 100 parts by weight of polyolefin, an antioxidant being introduced into a melt of polyolefin, functional monomer, and radical-generator not later than before said melt enters a compression zone in an extruder including an exit and a discharge zone preceding said compression zone at said extruder's exit.

21. The process according to claim 10, wherein the polyolefin polyethylene.

22. The process according to claim 13, wherein the graftable functional monomer is maleic anhydride.

* * * * *